Feb. 14, 1933.   D. E. PILCHER   1,897,532
EMASCULATOR
Filed July 11, 1931   2 Sheets-Sheet 1
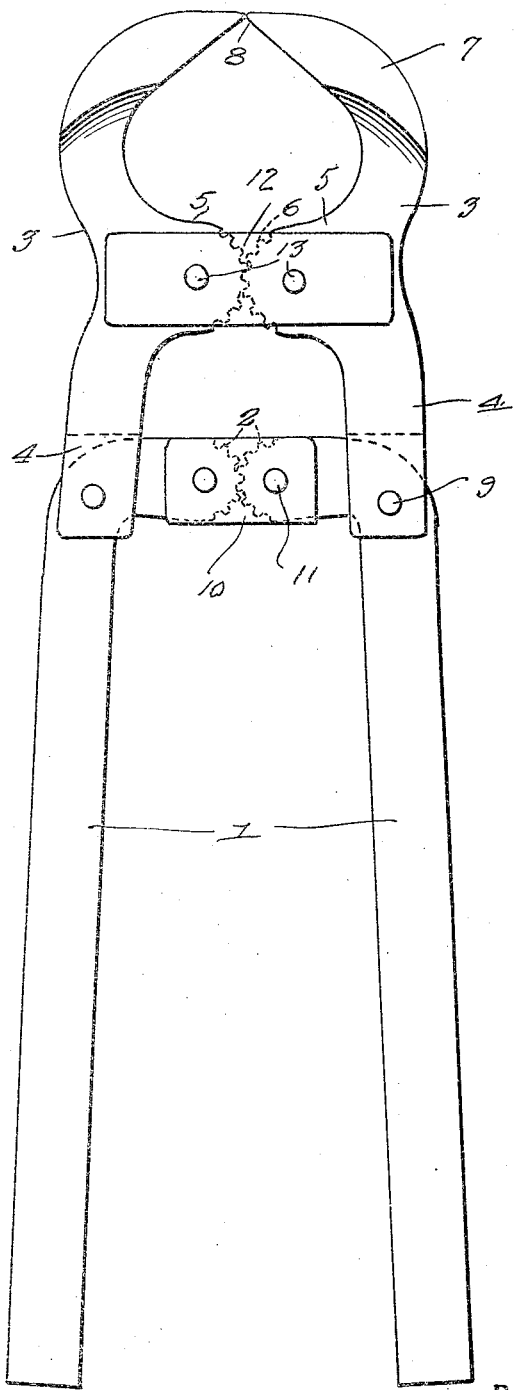
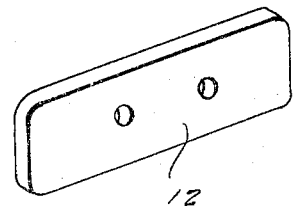
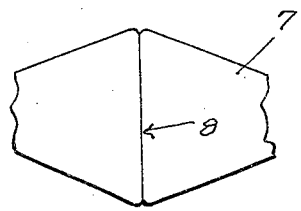
Inventor
D. E. Pilcher
By Clarence A. O'Brien
Attorney

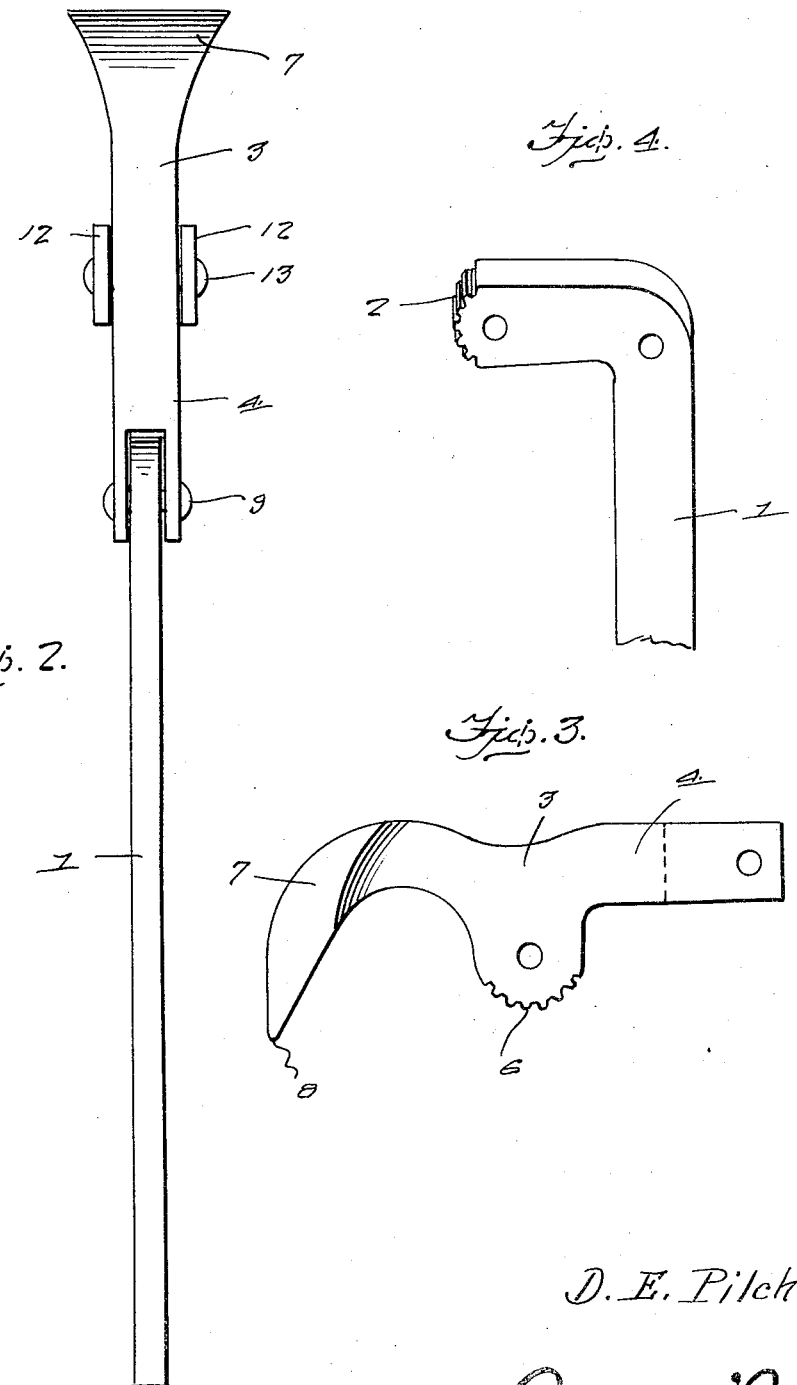

Patented Feb. 14, 1933

1,897,532

UNITED STATES PATENT OFFICE

DELBERT E. PILCHER, OF MANCOS, COLORADO

EMASCULATOR

Application filed July 11, 1931. Serial No. 550,215.

This invention relates to an emasculator, the general object of the invention being to provide a tool for severing the cord without cutting the skin or other parts, to cause an open wound, the tool consisting of a pair of handle parts and a pair of jaw parts, with means for imparting movement to the jaw parts by toggle action of the handle parts.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is an elevation of the improved tool.

Fig. 2 is an edge view thereof.

Fig. 3 is a view of one of the jaw members.

Fig. 4 is a partial view of one of the handle members.

Fig. 5 is a view of one of the jaw connecting plates.

Fig. 6 is a top plan view looking toward the beveled edges of the jaw.

In these drawings, the numeral 1 indicates a pair of handle members, each of which is of substantial L-shape with the end of the short limb rounded and toothed as shown at 2, and the numeral 3 indicates a pair of jaw members, each of which is provided with the forked shank 4, the intermediate inwardly extending projection 5, the end of which is rounded and toothed as shown at 6, and the curved jaw forming part 7, the free end of which is beveled and enlarged, with its operative edge rounded as shown at 8. Each jaw part 7 has an inner wall sloping outwardly and forwardly from its inner curved wall through the rounded edge 8 so as to provide a large space between the projection 5 and the forward part which carries the rounded portion 8, so that when the two jaw parts are connected together, the large space will be formed between the projections 5 and the jaws proper for admitting the fingers of the hand when performing the operation so that the parts of the animal can be manipulated to cause the rounded ends or edges to properly engage the cord.

Each handle member is pivoted to a forked part of a jaw member by a pivot 9, which passes through the prongs of the fork and through that part of the handle member where the two arms are connected together. A pair of plates 10 are spaced apart to receive the toothed parts 2 of the handle members between them, and these plates are pivoted to said part 2 of the handle members by the pins 11. A pair of elongated plates 12 is located one on each side of the projections 5 and these plates are pivoted to the projections by the pivot pins 13.

The toothed parts 2 of the handle members 1 mesh with each other as shown in dotted lines in Fig. 1, and the toothed portions of the projections 5 mesh with each other as shown in dotted lines in Fig. 1 so that these parts will roll on each other as the handles 1 are moved toward or away from each other and thus produce positive movement of the jaw members from the movement of the handle members towards and away from each other. The engagement of the toothed parts 2 with each other as well as the engagement of the toothed parts 6 of the projections 5 with each other will insure a smooth and uniform movement of the jaws 7 towards and away from each other and the jaw members 7 will be locked in closed position when the handle members are pressed towards each other in the position outlined in Figure 1.

Thus it will be seen that as the handle members are moved away from each other, with the parts arranged as shown in Fig. 1, a toggle action will be set up which will act to move the shanks 4 of the jaw members towards each other, and the jaw parts away from each other so as to open the tool. Of course the movement of the handle members in an opposite direction will result in the reverse operation to close the jaws.

This instrument is used for severing the cord leading to the testicles so as to render the animal impotent and by rounding the edges 8 of the jaw members, the skin or other parts are not cut, and thus an open wound is avoided.

Thus this instrument enables a bloodless operation to be performed in castrating animals so that there is no infection.

It is thought from the foregoing description that the advantages and novel features of the invention will be readily apparent.

It is to be understood that changes may be made in the construction and in the combination and arrangement of the several parts, provided that such changes fall within the scope of the appended claim.

Having thus described my invention, what I claim as new is:—

An emasculator of the class described comprising a pair of handle members each of L-shape to provide a long arm and a short arm, the ends of the short arms being rounded and toothed, a pair of plates extending over the rounded ends, one on each side of the short arms, and pivoted to said short arms adjacent the rounded ends thereof, a pair of jaw members each composed of a jaw part, a shank having a forked extremity and an inwardly extending intermediate projection having its free end rounded and toothed, said jaw part having its free end laterally enlarged and its free edge rounded, with the inner wall of said jaw part bowed outwardly between the intermediate projection and the outer end of the jaw part with the inner wall of said outer end sloping outwardly and forwardly from the curved portion of the wall to said rounded free edge, whereby, when the jaw members are in closed position, a large space will be formed between the projection and parts which carry the rounded gripping edges to permit the entrance of the fingers of an operator, a pair of plates extending over the said projections one on each side thereof and pivoted thereto adjacent the rounded ends of the projections for holding the teeth of the rounded ends of the projections in mesh with each other, the prongs of each shank fitting over that part of a handle member where the short arm joins the long arm and a pivot pin passing through said prongs and the handle member for pivotally connecting the jaw members to the handle members.

In testimony whereof I affix my signature.

DELBERT E. PILCHER.